United States Patent [19]

Siiberg

[11] 4,090,050

[45] May 16, 1978

[54] ELECTRO-MECHANICAL LIQUID LEVEL SENSOR

[75] Inventor: Hemming G. Siiberg, Summit, N.J.

[73] Assignee: Wagner Electric Corporation, Parsippany, N.J.

[21] Appl. No.: 725,101

[22] Filed: Sep. 20, 1976

[51] Int. Cl.² ............................................ H01H 35/18
[52] U.S. Cl. ..................... 200/84 C; 340/59; 340/244 E; 73/308; 200/61.2
[58] Field of Search ........... 335/205; 73/308, DIG. 5; 340/52 C, 59, 242, 244 A, 244 E; 200/61.2, 61.48, 84 C, 84 R

[56] References Cited

U.S. PATENT DOCUMENTS

| 3,366,276 | 1/1968 | Fridley | 200/84 C |
| 3,673,587 | 6/1972 | Baruch | 73/308 |
| 3,849,770 | 11/1974 | Hayashida | 340/59 |

FOREIGN PATENT DOCUMENTS 1,518,966  3/1968  France ................. 200/84 C

*Primary Examiner*—Gerald P. Tolin
*Attorney, Agent, or Firm*—Eyre, Mann, Lucas & Just

[57] ABSTRACT

An electro-mechanical liquid level sensor is disclosed. The sensor comprises a magnetically operable switch in response to liquid level to complete a circuit for actuating a warning light or the like. The switch comprises a movable electrical contact operative to be moved by magnetic force which is variable in accordance with liquid level whereby the circuit is completed upon a predetermined change in liquid level. The movable parts of the sensor and the structure associated therewith are self-aligning.

9 Claims, 2 Drawing Figures

ELECTRO-MECHANICAL LIQUID LEVEL SENSOR

FIELD OF THE INVENTION

The present invention relates to liquid level sensors and especially those for automotive applications such as in master brake cylinders.

DESCRIPTION OF THE PRIOR ART

Liquid level sensors are well known in the art for sensing the height of liquid in a container. One of the problems in sensing levels in a liquid container which is subject to motion such as in automobile master brake cylinders is that the motion imparted to the liquid can give erroneous false warnings of actual liquid level. This is caused especially when the container is for example, only half full whereby substantial movement of the liquid in the container can result even from such minor actions as acceleration and braking of a motor vehicle. Additionally, many known sensors required careful alignment between parts in order for the sensor to give an accurate indication of a predetermined change in liquid level. This adds time and expense to manufacturing in that assembly of the container requires manual adjustments between parts. It is also disadvantageous where the sensors are installed as aftermarket equipment or where the sensor is inadvertently disturbed during refilling of the liquid container.

In accordance with the present invention, erroneous readings of liquid level are materially reduced and careful adjustments of sensor parts of obviated by employing a self-aligning sensor.

SUMMARY OF THE INVENTION

The present invention is embodied in and carried out by a liquid level sensor comprising a container for liquid; first magnetic means positioned in the container operative to move in relation to the liquid level in the container; second magnetic means positioned in the container in a predetermined relationship with the first magnetic means operative to be moved from a first position to a second position upon reaching a threshold magnetic force between it and the first magnetic means and an electrical switch positioned in the sensor such that movement of the second magnetic means to its second position will close the electrical switch thereby energizing a signal means associated therewith. Further in accordance with the invention, the first magnetic means preferably comprises ferromagnetic or magnetically attractable material secured to a float which rises and falls with liquid level in the container and the second magnetic means comprises permanent magnet material positioned below the float means. To protect against erroneous liquid level readings, means may be provided in the float to maintain the float in an essentially predetermined attitude within the container regardless of container motion and vibration.

These and other aspects of the present invention will be more apparent from the following detailed description of the invention when considered in conjunction with the accompanying drawing.

BRIEF DESCRIPTION OF THE DRAWING

The invention is illustrated by way of example in the Figures of the accompanying drawing in which like numerals refer to like parts and in which.

DESCRIPTION OF THE PREFERRED EMBODIMENT

Figure 1:
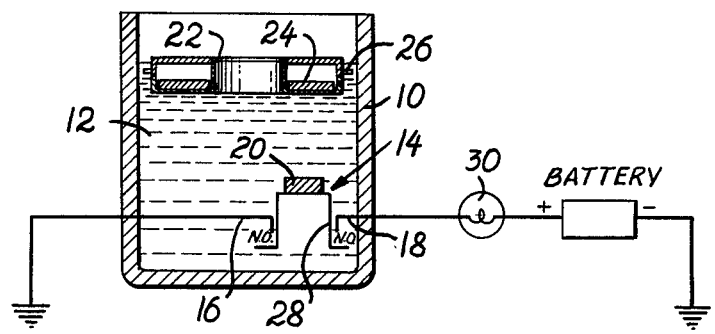
FIG. 1 is a schematic representation of a system employing an apparatus according to the present invention.

In FIG. 1 is shown a fluid reservoir 10 with a liquid 12 therein. While liquid 12 may be any liquid whose level it is desired to monitor, for purposes of illustrating the preferred embodiment, liquid 12 is suitably vehicle brake fluid. A switch 14 comprising conductive member 28 is engageable with contacts 16 and 18 and has a permanent magnet 20 affixed to the top thereof. Floating on the top of the liquid is a float assembly 22, suitably a hollow plastic assembly having an annular or other appropriately shaped hole essentially in the middle thereof to assist in preventing pivotable movement of the float as described more fully hereinafter. A magnetically attractable material 24 such as metal is disposed in the bottom of the float assembly. The magnetically attractable material is conveniently of toroidal shape to reduce weight. A spacing rim 26 is preferably employed to maintain the member 24 in the proper position in the fluid reservoir 10 and permit it to move in linear fashion so that as the float assembly drops the metal 24 will be directly above the magnet 20. When the float assembly drops to a position proximate the magnet, the magnet will be attracted upwardly thereby urging conductive member 28 to move linearly upward into engagement with contacts 16 and 18 to complete the circuit and light warning lamp 30.

Alternatively and, in fact, preferably the float is made of a magnetically attractable material, suitably ferromagnetic stainless steel. In this manner there need not be a two piece construction as is true with a plastic float having a magnetically attractable material therewithin. Furthermore, making the float of metal is highly desirable since it can withstand much greater temperatures than can most plastics.

Figure 2:
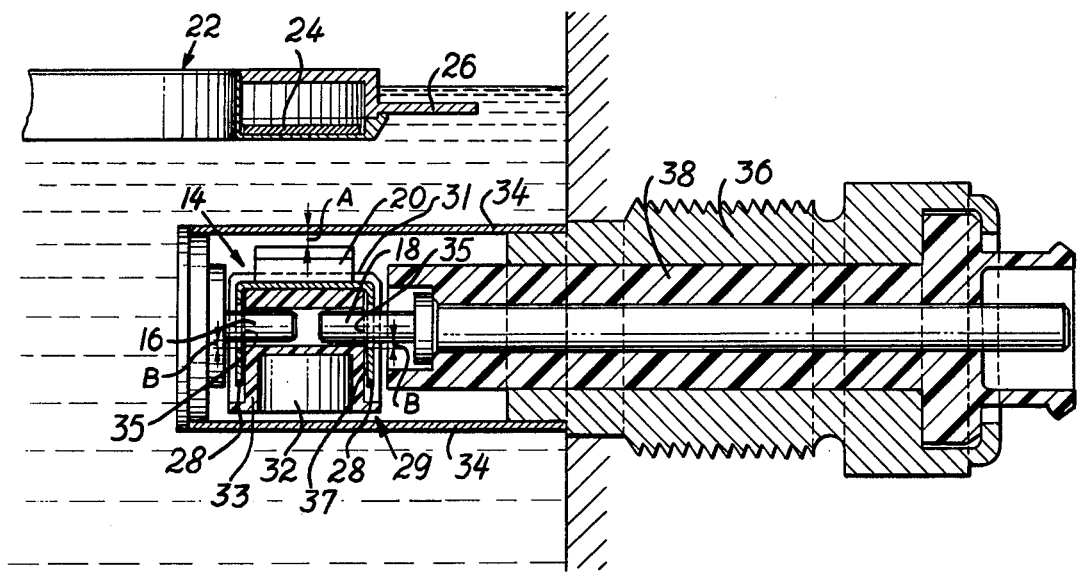
FIG. 2 is a detailed structure of the preferred embodiment of the apparatus of FIG. 1.

As shown in FIG. 2, switch 14 comprises movable contact 28 which is secured to magnet 20. Contact 28 is U-shaped and is disposed within pendulum assembly 29 to be translationally movable therein. Pendulum assembly 29 is mounted on pins 16 and 18 and is rotatable thereabout. Pendulum inner portion 33, made of non-conductive material, has openings 35 through which the pendulum is mounted on the pins. Openings 35 are sized to accept pins 16 and 18 in a pivotable manner. About inner portion 33 is positioned the U-shaped electrically conductive contact 28 which has openings that are larger than openings 35 as well as the diameter of pins 16 and 18. A counterweight 32 is positioned in the bottom of pendulum 29 to weigh the bottom of the pendulum thereby tending to maintain the magnet 20 in the position shown in FIG. 2. As shown in FIG. 2, the distance between magnet 20 and magnetic material 24 is sufficient so that the magnetic force therebetween is insufficient to lift contact 28 in slot 37. Contact 28, therefore, rests on pendulum inner portion 33 in a non-contacting position with respect to pins 16 and 18. The openings in contact 28 are preferably at least 20% larger than the diameter of pins 16 and 18 so that there is not contact therebetween with contact 28 in its rest position shown in FIG. 2. A shroud 34 of non-magnetically attractable material is disposed about the switch assembly 14 to maintain it free of contact with the liquid whereby short circuiting is prevented. The shroud may be made of a high temperature resistant plastic but it is preferably formed of a non-magnetically attractable metal such as brass or non-magnetic stainless steel so that it can withstand the high temperature of today's automobile engines and can also serve as an electrical conduit as more fully discussed hereinafter. The shroud 34 is spaced from the magnet 20 a distance A which is more than the distance B between contact 28 and pin contacts 16 and 18. Thus, when contact 28 is urged upward by the proximity of the magnetic material 24 in float 22, contact 28 will make positive contact with pins 16 and the linear upward movement of the contact 28 will be restrained by pins 16 and 18 rather than the shroud 34. With the fluid level shown in FIG. 2, the distance between the magnetic material 24 and magnet 20 is sufficient so that the magnetic force therebetween is insufficient to lift the magnet and contact 28. It is important to note that the float 22 is constrained within the container for movement while remaining essentially normal to the container side wall by means of extension or rim 26. Pendulum 29 also assists in preventing erroneous readings which would otherwise be caused by movement of the floating contact 28 in the vertical direction due to movement of the container. By providing pendulum 29 including counterweight 32, the assembly carrying the floating contact will tend to pivot under motion and vibration of the container rather than "bounce" or "jump" in the vertical direction. As the liquid level in container 10 falls, float 22 follows and after the liquid level in container 10 has fallen a predetermined level, magnetically attractable material 24 will be sufficiently close to magnet 20 so that the magnetic force therebetween will be at the threshold value which will lift the magnet 20 and the floating contact 28. Upon being moved vertically upwards, the opening in the floating contact 28 will move upwards until the contact 28 strikes and is stopped by pins 16 and 18. This closes the circuit shown in FIG. 1 to indicate a low fluid level.

In the embodiment shown in FIG. 2, the magnet 20, and the contact 28 are an integral but separate structure from the pendulum portion 31, 33 and the weight 32, the latter all being joined to each other. A hole (not shown) is provided in the top of the outer portion 31 of the pendulum through which the magnet 20 extends and is free to move thus permitting the contact 28 to engage the pins 16 and 18.

It will be appreciated that there can be various changes and modification in the pendulum structure; for example, the structure can be an integral unit. The disadvantage to this construction is that the magnetic force must be sufficient to lift the entire unit including the weight 32 whereas such is not required with the preferred embodiment as hereinbefore described.

The hole in the center of the float assembly 22 is to present disengagement of the magnet 20 and the magnetic material 24 if there is a total loss of fluid in the reservoir. Were the hole not present, the float 22 would pivot sharply about the end of the shroud 34, which could cause disengagement of the magnet 20 and the magnetic material 24 thereby giving an erroneous reading. The hole in the center of the float, resulting in an essentially toroidally shaped float, substantially eliminates this potential problem.

While for purposes of illustration the permanent magnet has been shown in the sensor assembly and the magnetic material such as metal has been shown in the float, and while this is the preferred form of construction, it will be appreciated that the materials could be reversed. The potential problem with such a reversal is that the reservoir 10 is usually formed of metal which could interfere with proper operation of the float. In a still further alternate embodiment, item 20 and 24 could both be of magnetic material but with their polarities oppositely aligned.

Because of the construction of the present invention in which the switch is operated by positive magnetic attraction rather than by repulsion, a positive reading is obtained once the threshold magnetic force has been reached. In the preferred form of the present invention, the magnetic attraction between elements 20 and 24 in the closed position is sufficiently great so that even subsequent raising of the liquid level in the reservoir will not separate the two elements but rather they must be separated by manual force.

It will be appreciated that the sensor described hereinbefore is self-aligning due to the float structure, fixed shroud 34 and pendulum assembly 29. As the housing 36 is screwed into the container 10, the pendulum rotates so that any point at which screwing is stopped the sensor is properly aligned. Similarly, minor rotation of the housing 36 by inadvertence, vibration or the like will not have a deleterious effect on alignment.

In the embodiment shown in FIG. 2, the contact 16 is not directly connected to ground. Rather, the brake fluid container is itself grounded and the contact 16 is grounded through the shroud 34 which is of brass or non-magnetic stainless steel. Because of the conductive effect of the housing 36, contact 18 is electrically isolated from the housing 36 of the switch assembly 14 by a suitable insulating material 38.

While the preferred embodiment describes the invention with respect to monitoring brake fluid level, it is to be understood that the invention has application in monitoring other fluids. However, the invention has particular application for use in vehicles and especially for indicating a low level of hydraulic brake fluid. The sensor described hereinbefore is essentially unaffected by normal vehicles movement and vibration because of the self-aligning feature, pivotable mounting of the floating contact and the positive force associated with closing the contacts. The sensor is simple in design, rugged and essentially unaffected by fluid temperature.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purpose of the disclosure without departing from the spirit and scope of the invention.

What is claimed is:
1. A liquid level indicator comprising:
(a) a container for a liquid;
(b) a switch housing disposed in the container at a level below normal liquid level height, the interior of said switch housing being liquidly isolated from said container and said switch housing including:
(i) a pair of spaced contacts;
(ii) an electrically conductive member operable between a first position wherein it is spaced from the contacts and a second position wherein it engages the contacts and closed a circuit;
(iii) a magnet affixed to said electrically conductive member;

(c) a float assembly adapted for floating at the top of liquid in said container, said float assembly including a magnetically attractable material;

(d) said magnetic being attracted to the magnetically attractable material when the liquid level reaches a predetermined level whereby the electrically conductive member is urged into engagement with the pair of contacts; and (e) the force of attraction between the magnet and the magnetically attractable material being greater than the buoyant force of the float assembly in the liquid.

2. The apparatus of claim 1 wherein the float assembly and magnetically attractable material are of toroidal shape.

3. The apparatus of claim 1 wherein the float assembly further comprises a spacing rim about its periphery for maintaining the magnetically attractable material in a predetermined altitude in the container.

4. The apparatus of claim 1 wherein the switch assembly is isolated from the liquid by a non-magnetically attractable shroud.

5. The apparatus of claim 4 wherein the shroud is spaced from the magnet a distance greater than the electrically conductive member is spaced from the contacts in its first position.

6. A liquid level indicator comprising:
(a) a container for a liquid said container having a sidewall;
(b) an electrical circuit;
(c) a switching assembly for said electrical circuit rigidly fixed in the sidewall of the container at a level below normal liquid level height, said switching assembly comprising:
   (i) a pair of spaced pivot members, each of said pivot members having an electrical contact portion in electrical communication with said electrical circuit;
   (ii) a pendulum assembly mounted on said pivot members, said pendulum assembly being free to pivot around a horizontal axis on said pivot members, said pendulum assembly including a contact member moveable between a first position in which it is electrically isolated from at least one of said contact portions and a second position in which it is in electrical communication with each said electrical contact portion, said contact member having first magnetic means attached thereto;

(d) a float assembly for floating at the top of the liquid, said float assembly including second magnetic means;

(e) said second magnetic means being attracted to the first magnetic means when the float assembly reaches a predetermined level, whereby the contact member moves from its first position to its second position.

7. The apparatus of claim 6 wherein the float assembly and magnetically attractable material are of toroidal shape.

8. The apparatus of claim 6 wherein the float assembly further comprises a spacing rim about its periphery for maintaining the magnetically attractable material in a predetermined altitude in the container.

9. A switching assembly for a liquid level sensor, said switching assembly including:
(a) a pair of spaced pivot members, each of said pivot members having an electrical contact portion associated therewith;
(b) a pendulum assembly mounted on said pivot members, said pendulum assembly being free to pivot around a horizontal axis on said pivot members, said pendulum assembly including a contact member moveable between a first position in which it is electrically isolated from at least one of said contact portions and a second position in which it is in electrical communication with each said electrical contact portion, said contact member having magnetic means attached thereto;
(c) said contact member being normally in its first position but moveable to its second position in response to magnetic attraction of said magnetic means.

* * * * *